Figure 3:
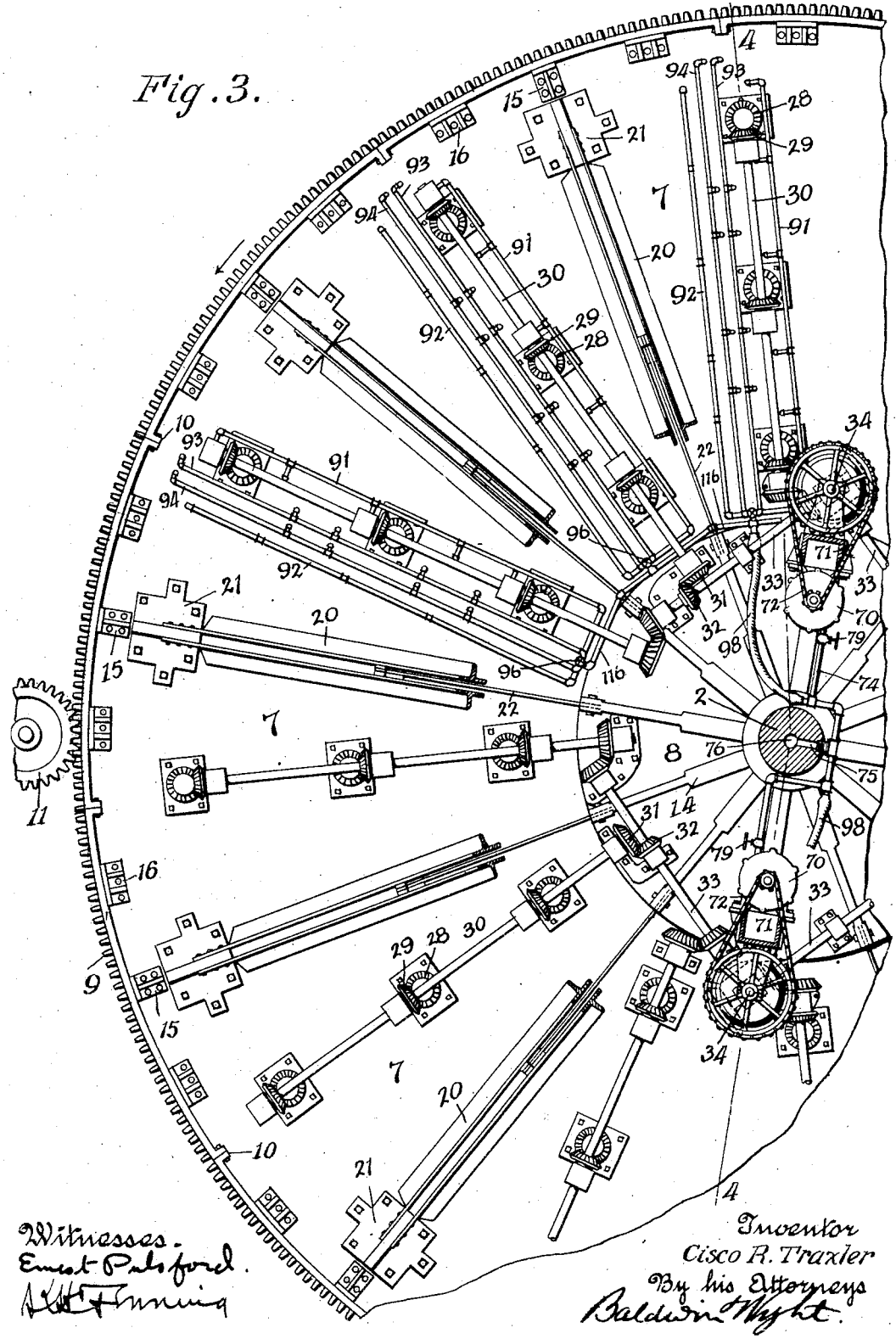

No. 785,986. PATENTED MAR. 28, 1905.
C. R. TRAXLER.
VENEER CUTTING MACHINE.
APPLICATION FILED JUNE 11, 1904.
7 SHEETS—SHEET 1.
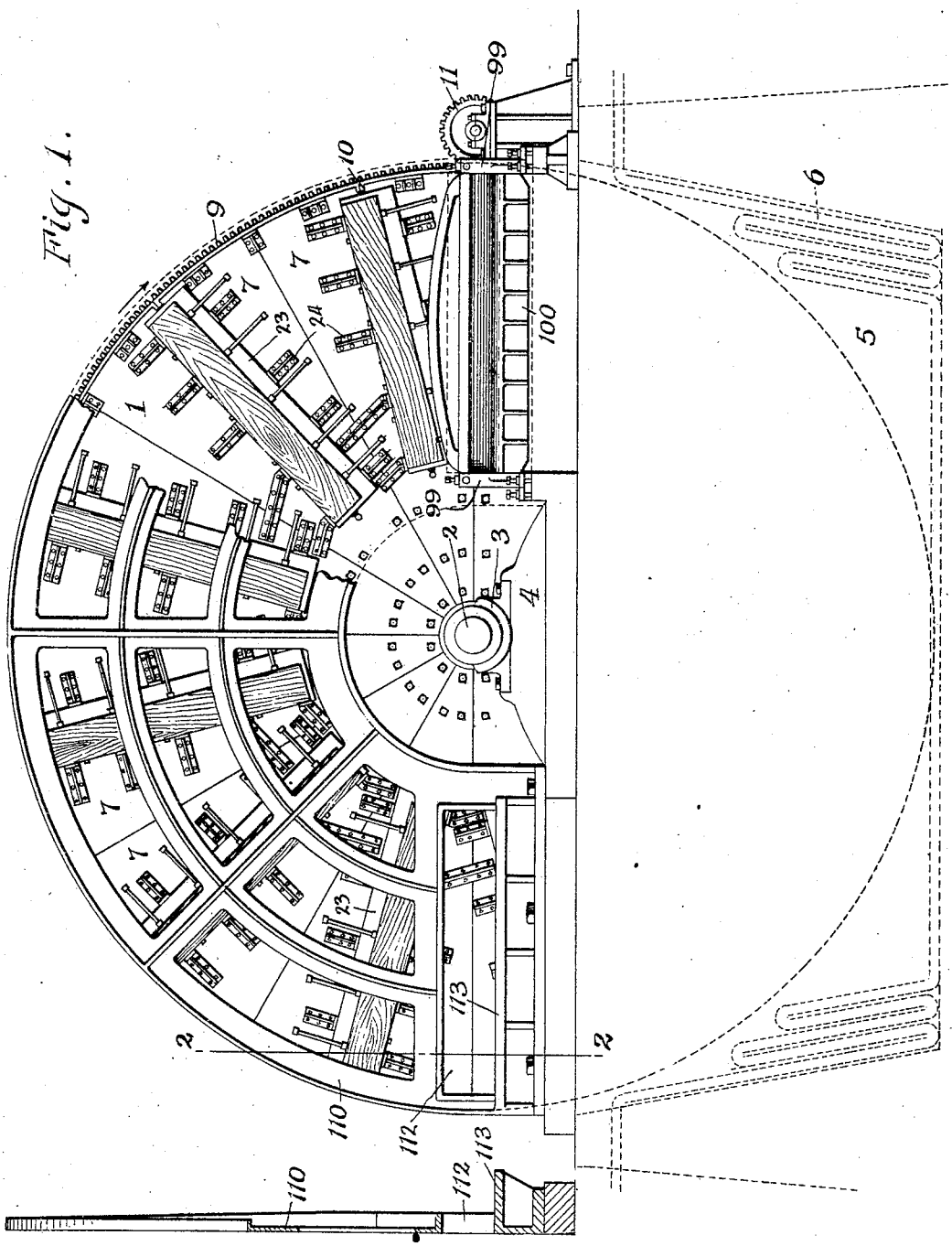

No. 785,986. PATENTED MAR. 28, 1905.
C. R. TRAXLER.
VENEER CUTTING MACHINE.
APPLICATION FILED JUNE 11, 1904.

7 SHEETS—SHEET 2.

Witnesses
Ernest Pulsford
A. H. Finning

Inventor
Cisco R. Traxler
By his Attorneys
Baldwin Wight

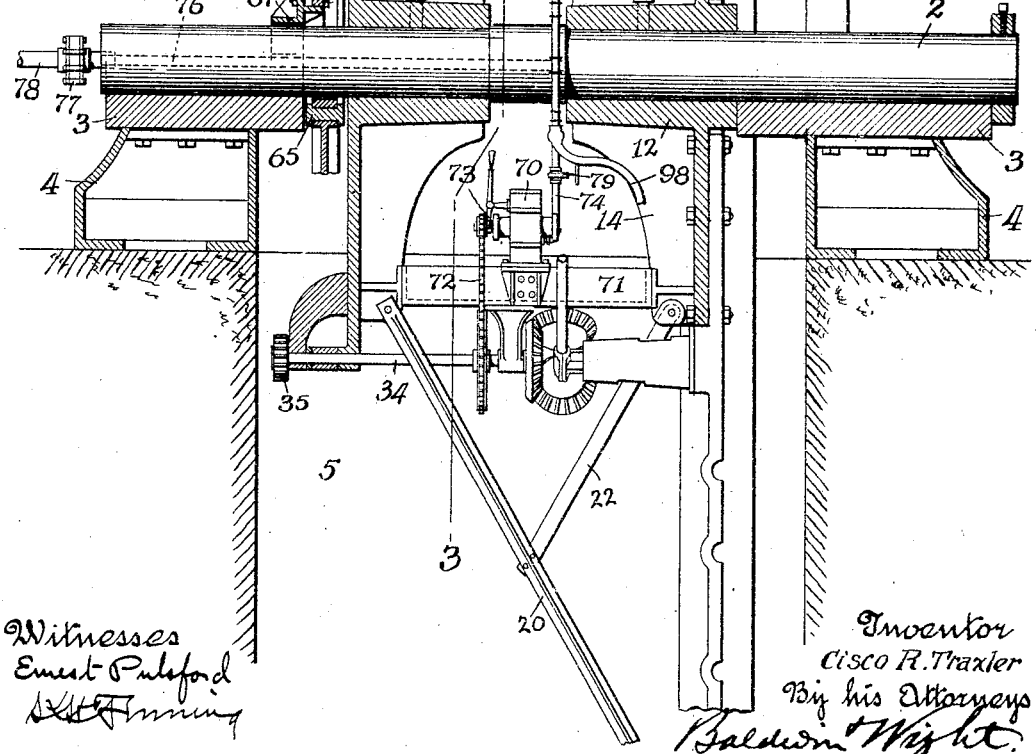

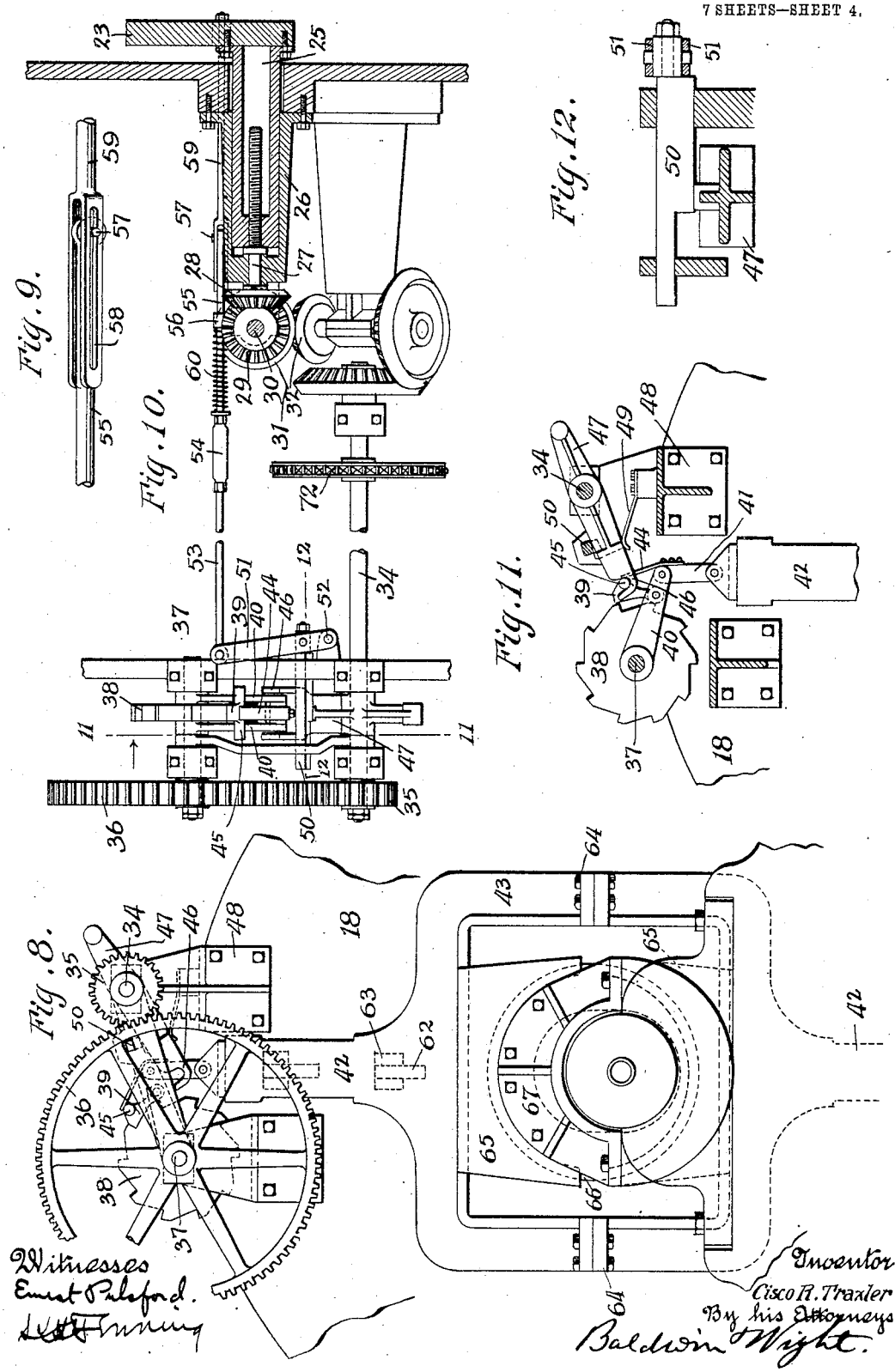

No. 785,986. PATENTED MAR. 28, 1905.
C. R. TRAXLER.
VENEER CUTTING MACHINE.
APPLICATION FILED JUNE 11, 1904.

7 SHEETS—SHEET 5.

Witnesses
Ernest Pulsford
[signature]

Inventor
Cisco R. Traxler
By his Attorneys
Baldwin Wight

No. 785,986. PATENTED MAR. 28, 1905.
C. R. TRAXLER.
VENEER CUTTING MACHINE.
APPLICATION FILED JUNE 11, 1904.

7 SHEETS—SHEET 6.

Witnesses
Ernest Paleford.

Inventor
Cisco R. Traxler
By his Attorneys
Baldwin Wight

No. 785,986. PATENTED MAR. 28, 1905.
C. R. TRAXLER.
VENEER CUTTING MACHINE.
APPLICATION FILED JUNE 11, 1904.
7 SHEETS—SHEET 7.
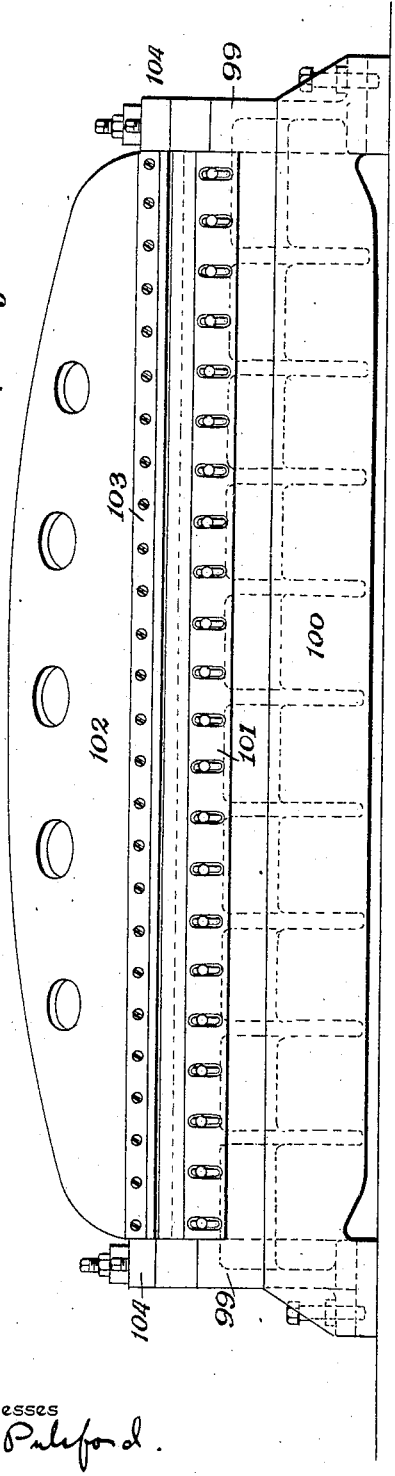
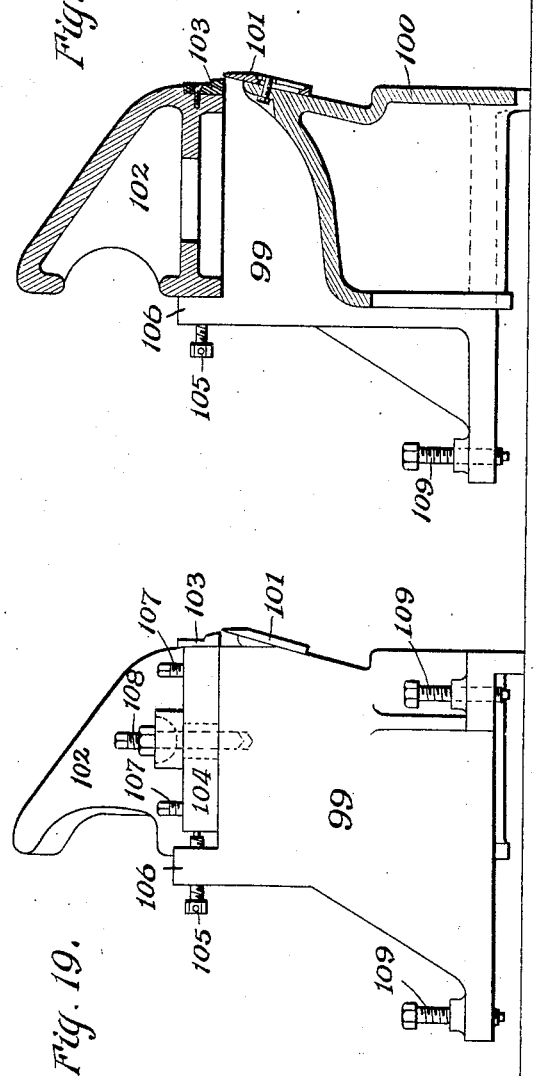
Witnesses
Inventor
Cisco R. Traxler
By his Attorneys No. 785,986.

Patented March 28, 1905.

UNITED STATES PATENT OFFICE.

CISCO R. TRAXLER, OF WINSTON SALEM, NORTH CAROLINA, ASSIGNOR TO UNITED STATES VENEER COMPANY, OF WINSTON SALEM, NORTH CAROLINA, A CORPORATION OF NORTH CAROLINA.

VENEER-CUTTING MACHINE.

SPECIFICATION forming part of Letters Patent No. 785,986, dated March 28, 1905.

Application filed June 11, 1904. Serial No. 212,095.

*To all whom it may concern:*

Be it known that I, CISCO R. TRAXLER, a citizen of the United States, residing at Winston Salem, in the county of Forsyth and State of North Carolina, have invented certain new and useful Improvements in Veneer-Cutting Machines, of which the following is a specification.

This invention relates to machines for cutting thin slices, slabs, or sheets of veneer from blocks or "bolts" of wood, and particularly to machines adapted to cut veneer from quartered oak. In my United States Patent No. 739,565, of September 22, 1903, I have shown a machine especially adapted for this purpose, in which a plurality of blocks or bolts are presented in quick succession to a slicing-knife while all traveling in the same direction and in the same plane around the axis of a rotary carrier in such manner as to produce a shear cut. The rotary block-carrier is in the form of a large wheel which is mounted to revolve about a horizontal axis and to convey the blocks of wood past the slicing-knife, which is set in a stationary frame at one side of the machine. The block-carrier is provided with radially-arranged stay-logs equipped with chucks for securing the blocks rigidly in place, and mechanism is provided for automatically advancing the stay-logs at proper intervals as the wheel revolves to present the blocks in such manner as to enable the knife to sever successive slices from each block. The slicing-knife is arranged radially, or substantially so, with reference to the axis of the block-carrier, and the blocks travel in a vertical plane only, thus causing the knife to make a straight even cut. A machine constructed in accordance with my present invention embodies all of these characteristics; but certain changes have been made in the machine which render it more efficient and more easily operated and adjusted. In my prior machine the chucks for securing the blocks to the stay-logs were each made independently adjustable by hand. While this insures a very accurate adjustment and a very secure connection between the blocks and the stay-logs, much time was necessarily consumed in securing the blocks in place. According to my present invention the chucks are operated by power, preferably steam, in such manner that while they are set simultaneously they have independent movement, so that each chuck will adjust itself to any irregularity in the block and will be firmly attached thereto. In my prior machine the stay-logs were moved back to their initial position by means of hand-cranks or by means of springs, which while the stay-logs were being advanced were wound and put under tension sufficient to return the stay-logs as soon as the mechanism was tripped. In my improved machine the stay-logs are returned by means of motors, preferably steam-engines, geared to them and under the control of the attendant, and which are put into operation after the advance of the stay-logs has been automatically stopped. The machine has also been changed in some other particulars, which will hereinafter be fully described.

Figures 13, 14:
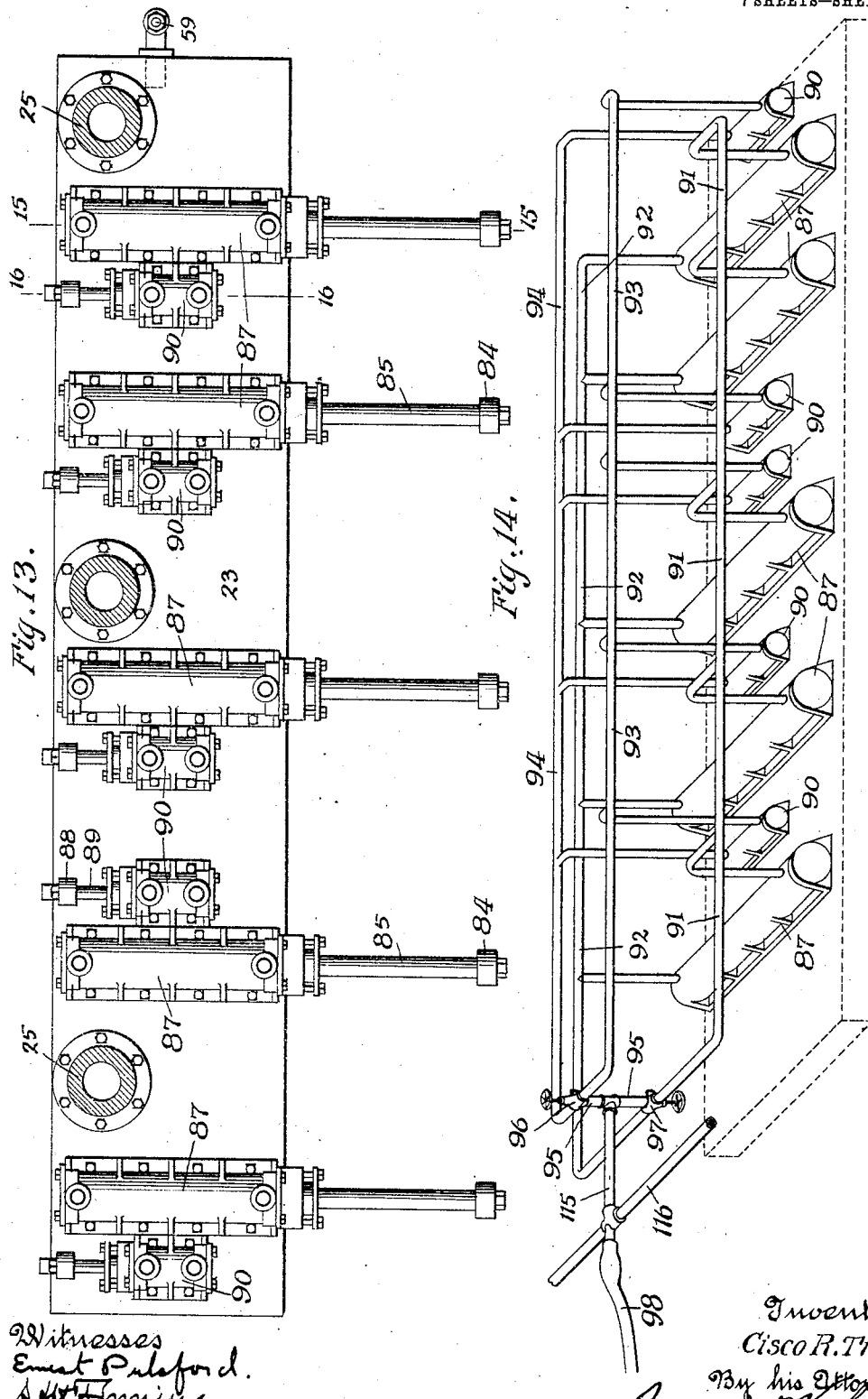
Figure 15:
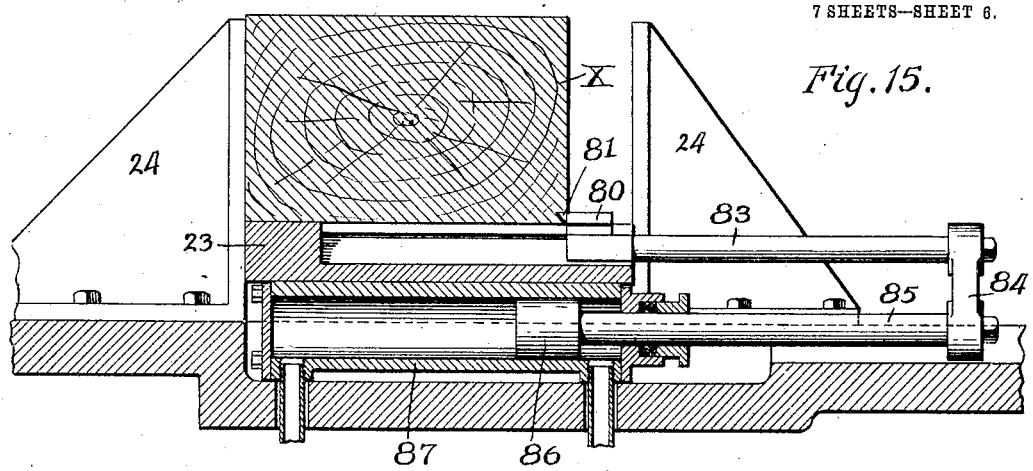
Figure 16:
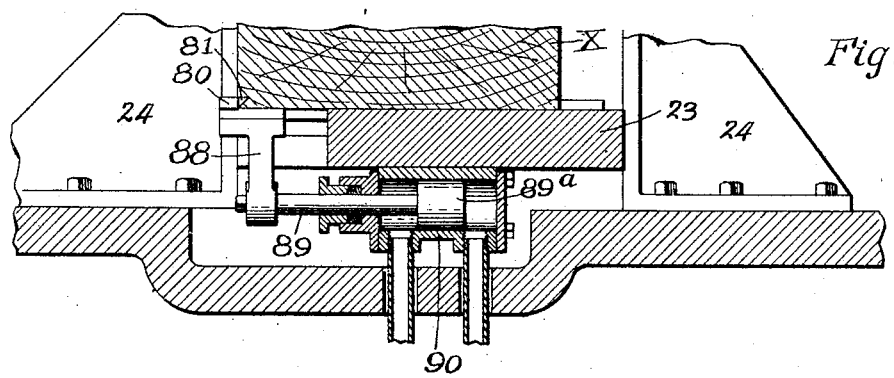
Figure 17:
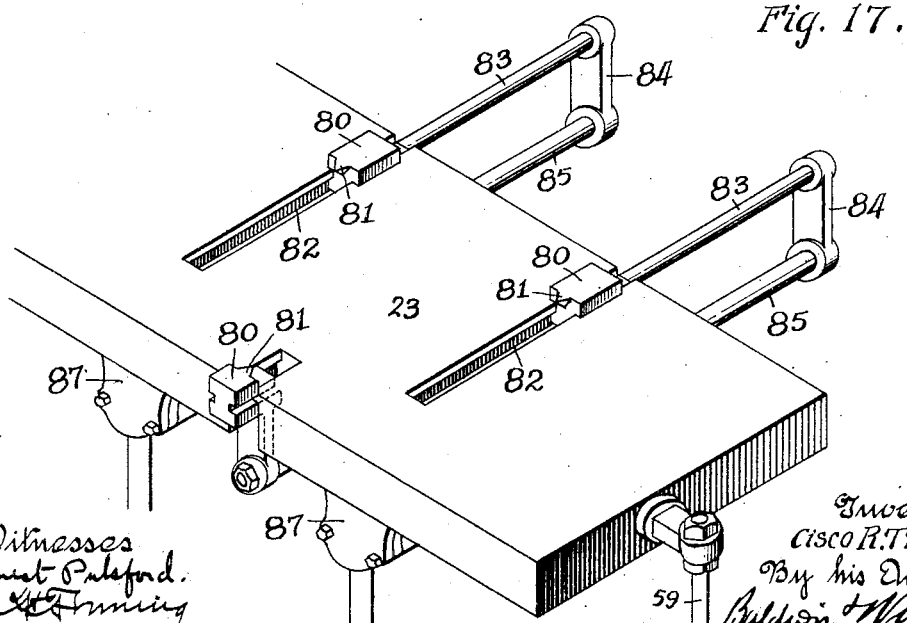

In the accompanying drawings, Figure 1 shows a front elevation of my improved machine, some parts being indicated by dotted lines and some parts being broken away in order to better illustrate other parts. Fig. 2 is a view, partly in side elevation and partly in section, on the line 2 2 of Fig. 1, illustrating particularly the fender or shield employed at the front of the machine. Fig. 3 shows a vertical section on the line 3 3 of Fig. 4, some of the piping being omitted. Fig. 4 shows a vertical section on the line 4 4 of Fig. 3. Figs. 3 and 4 are on a larger scale than Fig. 1, and the remaining views are also all on an enlarged scale. Fig. 5 is a perspective view of one of the four-way valves employed in the apparatus for operating the stay-log chucks. Fig. 6 shows a section thereof. Fig. 7 is a detail view in section, showing the manner in which the eccentric-straps of the stay-log set-works are guided. Fig. 8 is a detail view in rear elevation, showing the manner in which the stay-log set-works are operated from the main shaft. Fig. 9 is a detail view in perspective of part of the mechanism for stopping the advance of the stay-logs. Fig. 10 is a detail view of the stay-log set-works in section on the line 10 10 of Fig. 4. Fig. 11 shows a section of the same on the line 11 11 of Fig. 10. Fig. 12 is a detail view in section of part of the stop mechanism for the set-works. Fig. 13 is a view of one of the stay-logs and shows particularly how the chucks and their operating mechanism are arranged thereon. Fig. 14 is a diagram showing the pipes connecting the chuck-cylinders with the source of steam-supply. Figs. 15 and 16 are views in transverse section, showing particularly how the blocks are supported on the stay-logs and how the chucks hold the blocks in place thereon. Fig. 17 is a perspective view of a portion of a stay-log with its chucks. Figs. 18, 19, and 20 are views of the slicing-knife, Fig. 18 being a rear elevation thereof, Fig. 19 an end elevation, and Fig. 20 a transverse section.

The rotary block-carrier 1 is attached to a shaft 2, mounted in bearings 3, secured to sills 4, supported on opposite sides of a pit 5. As the carrier is intended to be made of large diameter—say thirty feet or more—its lower portion is arranged to revolve in the pit, and the walls of the pit are made quite solid and substantial in order to support the great weight and withstand all shocks, jars, or vibrations which may occur accidentally or in the ordinary operation of the mechanism. The pit may be lined with cement or other suitable material and partially filled with water kept hot by steam-pipes 6. (Shown by dotted lines in Fig. 1.) By this arrangement the lower portion of the block-carrier is kept submerged, and thus the blocks or bolts of wood are maintained in proper condition to be cut or sliced, avoiding the necessity of steaming or boiling the timber before it is attached to the machine. The block-carrier is composed of a number of sector-shaped plates or sections 7, which are attached at their inner ends to a hub 8 and at their outer ends are connected so as to form a complete disk or wheel. On the outside or periphery of the wheel there is a continuous series of teeth 9, preferably formed in segmental castings bolted to the plates 7 and bolted to each other at 10. The block-carrier is rotated by a pinion 11, which gears with the teeth 9 and which may be driven in any suitable way. The hub 8 is shown as consisting of a sleeve 12, secured to the shaft 2 and having a circular flange 13, to which the inner ends of the plates 7 are bolted. It also has a series (twelve being shown) of ribs 14, which serve to stiffen it. The plates 7 are connected and held together near their outer ends by brackets 15, to which the toothed segments 9 are attached, and these segments are also attached to brackets 16, carried by the plates. Another hub, 17, on the shaft 2, in rear of the hub 8, has a flange 18 and ribs 19, similar to the flange 13, and ribs 14 on the front hub. Diagonal rods 20, attached to brackets 21 near the outer end of the wheel, extend therefrom to the ribs 19 on the hub 17. The brackets 21, as shown, overlap the joint between the plates 7 and serve to connect them, as well as forming points of attachment for the diagonal bracing-rods 20. Other bracing-rods, 22, extend from the ribs 14 of the front hub rearwardly and outwardly and connect with the braces 20 about midway between their ends, as shown in Fig. 4. Preferably the diagonal bracing-rods 20 are made of T-iron, as indicated in Fig. 3, while the bracing-rods 22 may be made of bar-iron of rectangular cross-section. By these devices the wheel as a whole is made strong and rigid.

The stay-logs 23 are arranged radially on the front side of the block-carrier between guide-brackets 24, attached to the wheel in the manner shown in Figs. 1, 4, 15, and 16. Any suitable number of brackets may be used so long as a sufficient number is employed to hold the stay-logs in substantially radial lines and permit them to be advanced and withdrawn properly. I have shown a machine in which twelve stay-logs are employed and the mechanism is organized to accommodate that number of stay-logs. Of course this number may be varied and the mechanism may be suitably changed to accommodate any variation in the number of stay-logs employed. Each stay-log is shown as being provided with a number (preferably three) of rearwardly-projecting hollow arms 25, fitting cylindrical sockets or casings 26, attached to the plates 7. Through the rear end of each socket 26 projects a rod 27, that is free to revolve in the end of the socket, but is prevented from moving endwise therein. The inner or forward end of the rod is threaded and engages a threaded opening in the rear end of the arm 25, the arrangement being such that by turning the rods 27 the stay-logs may be advanced or retracted. Each rod 27 on each stay-log carries a bevel-pinion 28, which gears with a corresponding pinion 29 on one of the radial shafts 30. Each shaft 30 is shown in Fig. 3 as being provided with three pinions 29, gearing with three pinions 28, connected with the stay-log in the manner before specified and as particularly shown in Fig. 10. Each radial shaft 30 carries at its inner end a bevel-pinion 31, gearing with a bevel-pinion 32 on a tangential shaft 33. There are four tangential shafts 33, each geared with three of the shafts 30. These tangential shafts are arranged in suitable bearings on the hub of the block-carrier, the arrangement being clearly shown in Fig. 3. The shafts 33 are geared to two shafts 34, which extend rearwardly past the rear hub 17 in the manner shown in Fig. 10. The four shafts 33 are geared to these two shafts 34 in the manner clearly indicated in Fig. 3. Each shaft 34 carries a pinion 35, gearing with a spur-wheel 36, of large diameter, on a stud-shaft 37, projecting rearwardly from the flange 18 of the rear hub. Each shaft 37 carries a ratchet-wheel 38, with which is adapted to engage a pawl 39, carried by arms 40, hung on the stud-shaft 37 and connected by a link 41 with the radially-projecting arm 42 of the eccentric-frame 43. A spring 44 tends to hold the pawl 39 in engagement with the ratchet-wheel; but at times the pawl is held out of engagement with the ratchet-wheel by the mechanism next to be described. Each pawl is provided with a pin 45, which projects across the path of the hooked end 46 of a lever 47, mounted in suitable bearings on a bracket 48, projecting from the hub and pressed by a spring 49 in such direction as to cause the hook at 46 to engage the pin 45 and withdraw the pawl from the ratchet-wheel. The lever 47 is, however, normally held against the force of the spring 49 in such position as to be disengaged from the pawl 39 by a sliding block 50. (Shown most clearly in Fig. 12.) This block, as will be observed, has a wide forward portion and a narrower rear portion. It is pivotally connected at its front end with a lever 51, pivoted at 52 to a bracket attached to the rear hub, and connected at its opposite end with a rod 53, in turn connected by an adjustable sleeve-nut 54 with another rod, 55, extending through a guide-bracket 56 and carrying a pin 57, adapted to move in slots 58 in the bifurcated end of a rod 59, which is connected with the inner end of one of the stay-logs. The arrangement is such that when the stay-logs are in their rearward position or are advancing from their rearward to their forward position the rod 59 advances without moving the rod 53 in rear of it; but after the stay-log has advanced to near the end of its forward movement the pin 57 will strike the rear end of the slot 58, and then the rod 53 will be moved forward, causing the block 50 to be pulled forward until the wider portion thereof is withdrawn from the lever 47. This permits the lever to be moved by its spring 49, and the pawl 39 will be withdrawn from engagement with the ratchet-wheel 38, so that the advance of the stay-logs is suspended. A spring 60, interposed between the bracket 56 and sleeve-nut 54, tends to move the rod 53 rearward, and hence to hold the wider portion of the block 50 over the lever 47. This spring is not put under tension until after the stay-rods have moved forward to some extent. In order to reset the block 50, it is only necessary to move the lever 47 downward and shove the block 50 rearward.

It will be understood that there are two sets of devices for arresting the advance of the stay-logs. They are mounted on opposite sides of the machine, as indicated, it being necessary only to use one set of such devices in connection with each shaft 34.

Each pawl 39 is, as before stated, connected with an arm 42 of the eccentric-frame 43. The arms 42 on this frame are shown in Fig. 8 as being arranged on diametrically opposite sides of the frame, and the frame is arranged to move radially with reference to the axis of the shaft, being guided by ribs 62 on the flange 18 of the rear hub, fitting lugs 63, projecting from the inner or forward face of the frame 43. The eccentric-frame is made in sections bolted together at 64, and each of these sections carries a shoe 65, fitting an eccentric 66, rigidly connected with the bracket 67, forming a part of the rear bearing 3. It will be understood that the shoes 65 are revolved around the eccentric 66, and the eccentric-frame is reciprocated in such manner as to actuate the pawls 39, and thereby revolve the shafts 37 step by step. In this way the stay-logs are advanced properly and at the right time to permit successive slices to be cut from them by the stationary slicing-knife. The operation in general is similar to that described in my patent before mentioned. The details of the mechanism have been considerably changed.

In my prior patent the stay-logs were automatically returned by means of springs which were coiled and put under tension as the stay-logs advanced and which operated to return the stay-logs as soon as certain mechanism was tripped. According to my present invention I mount on the block-carrier one or more (preferably two) rotary steam-engines, which may be quickly coupled to the stay-log-operating mechanism in such manner as to cause the retreat of the stay-logs at the proper time. Each of these engines 70 is shown as being mounted on a frame 71, connecting the front and rear hubs of the block-carrier. Each engine is connected by sprocket-gearing 72 with one of the shafts 34, and clutch mechanism 73 is employed, by means of which the shaft 34 may be quickly coupled to or disconnected from the engine. Steam is supplied to the engines through pipes 74, connected with a pipe 75, communicating with another pipe 76 arranged concentric with the axis of the shaft 2. This pipe 76 is connected at 77 with a supply-pipe 78. Each pipe 74 may be provided with suitable valves, such as that shown at 79. It will therefore be understood that the stay-logs are advanced by means of a stationary eccentric, which operates an eccentric-frame connecting with pawl-and-ratchet mechanism geared to the stay-logs, while they are made to retreat by entirely separate mechanism—in this instance a steam-engine. The stay-logs may be caused to retreat when the carrier is stationary or when it is moving. It is obvious that other motors—such as gas-motors, compressed-air engines, or electric motors—may be substituted for the steam-engine shown.

In my prior patent each stay-log was provided with a series of chucks on opposite sides, each of which was movable or adjustable independently of the others. I have now devised mechanism by means of which all the chucks on one side of the stay-log may be operated or adjusted simultaneously but independently in a sense because a greater movement may be given to one or more of the stay-logs than to the others on the same side, depending entirely upon the shape of the block to which the chucks are attached.

In Fig. 17 the chucks 80 are shown as consisting of blocks having spurs 81, adapted to engage the block X and having suitable tongue-and-groove connections with slots 82 in the stay-logs. The chucks 80 on one side of the stay-logs are attached to relatively long rods 83, connected by cross-heads 84 with piston-rods 85, having pistons 86 working in cylinders 87, attached to the rear face of the stay-log in the manner shown in Figs. 13 and 14. The chucks 80 on the opposite side of the stay-logs are in like manner connected by cross-heads 88 to relatively short piston-rods 89, having pistons 89$^a$ working in cylinders 90, arranged on the stay-log in the manner illustrated in Figs. 13 and 14. In the drawings I have shown five chucks on each side of each stay-log, and there are five corresponding large cylinders 87 and five small cylinders 90, but of course this number may be varied. Each of the larger cylinders, as shown clearly in Fig. 14, is connected at one end with a supply-pipe 91 and at the opposite end with a corresponding pipe 92, while each of the smaller cylinders is in like manner connected to the pipes 93 94. These pipes are connected with a pipe 95 by means of four-way valves 96 97 of the general kind illustrated in Figs. 5 and 6 and which are provided with exhaust-ports 114. When securing a block to a stay-log, both sets of chucks are withdrawn to the longitudinal edges of the stay-log. Then steam is admitted behind the pistons 86 and the chucks 80 are forced against the block X and the block is forced against the brackets 24, in the manner indicated in Fig. 15, the spurs 81 at the same time embedding themselves in the block. The steam is still left on and then steam is admitted behind the pistons 89$^a$ in the shorter cylinders and the spurs on the corresponding chucks are driven firmly into the block X without moving it away from the brackets 24. When it is desired to release the block or spalt from the stay-log, steam is admitted at the opposite ends of the cylinders and the chucks are withdrawn. The pipe 95 is connected by a pipe 96 with another pipe 97, which connects with another flexible pipe 98, in turn connected with the supply-pipe 76 in the manner shown in Figs. 3 and 4.

The slicing devices are shown in detail in Figs. 18, 19, and 20. The end pieces 99 are connected by a cross-piece 100, which carries an adjustable knife 101. On the top of the cross-pieces 99 is supported a cross-head 102, carrying the other member, 103, of the cutter. The cross-head 102 has arms 104 resting on the top of the end pieces, and this cross-head may be adjusted by set-screws 105, projecting horizontally through lugs 106 on the end pieces. The cross-head may be adjusted and secured in place by screws 107 108. The cutter-frame may be tilted and otherwise adjusted bodily by means of set-screws 109 at the opposite corners of the frame. In this way the knife may be given the desired tilt or inclination and may be adjusted toward and from the block-carrier in such manner as to afford a true and even cut of the desired thickness. Fig. 1 shows the position of the cutter relatively to the block-carrier. It is the same as that shown in my prior patent.

In order to protect the workmen and to prevent the blocks of wood from being thrown out forwardly in case they become detached from the stay-logs, I provide a shield or fender 110, (see Figs. 1 and 2,) which consists merely of a semicircular open-work casting attached to the front sills 4 and covering the semicircular front portion of the carrier above the pit. It is formed with a rectangular opening to accommodate the cutter and with a similar opening 112 to permit the blocks to be inserted into the carrier. If desired, a shelf 113 may be formed on or secured to the shield below and in front of the opening 112, so that when feeding the block-carrier the blocks may be first supported on the shelf and then slid into position against the stay-logs. This shield is similar in all respects to that shown in my beforementioned patent.

The operation of the machine, the construction of which has been now fully described, is as follows: Before the carrier is supplied with the blocks or bolts X the stay-logs are moved to their rearmost position. This may be done by means of the steam-engines 70 in the manner before described. Then the carrier is slowly turned in the direction of the arrow in Fig. 1 until each stay-log in succession has been brought opposite the opening 112, stopping each time to enable the attendant to feed a block through the opening against the stay-log. The chucks are then operated in the manner before described to firmly secure the block to the stay-log. As the stay-logs move upwardly and around the axis of the carrier the "set-works" are operated in the manner before described to advance the blocks three at a time, so as to present them properly to the slicing-knife. As the three blocks thus set engage the knife slices or sheets of veneer are sheared from them. In like manner the other three sets of stay-logs are supplied with blocks which are advanced or set in the same way. After this the carrier may be moved continuously until the blocks have been cut down to the "spalts," at which time the blocks 50 trip the ratchet mechanism and the further advance of the stay-logs is prevented. As soon as this occurs the revolution of the carrier may be stopped and the stay-logs may be returned by means of the steam-engines 70, the clutches 73 being properly operated for this purpose. It is possible, if desired, to return the stay-logs in this way before the carrier has slowed down. After this the spalts may be removed and new blocks may be mounted in the carrier in the manner before described.

It will now be understood that in general outline my improved machine is similar to that shown in my patent of September 22, 1903, before referred to. The most prominent distinguishing characteristics in my present machine are the improved means for operating the chucks and the improved means for returning the stay-logs; but it will be observed that there are also novel features in the stay-log set-works and in other parts of the machine. These novel features are pointed out in the claims.

While the stay-logs have a general radial arrangement, it will be understood that I prefer to arrange them as in my prior patent in order to produce a shear cut with the least shock or jar.

In my application for patent, Serial No. 248,375, filed March 6, 1905, I have shown cylinders attached to a stay-log and supplied with steam in such manner as to keep the stay-log hot, and thus heat the bolt or block of wood secured thereto. I do not herein claim such subject-matter.

I claim as my invention—

1. In a veneer-cutting machine, the combination with a slicing-knife, of a rotary block-carrier, a series of integral stay-logs each of substantially the length of the block to be cut and arranged radially on the carrier, a series of chucks carried by each stay-log and projecting from its front face for rigidly securing a block thereto, cylinders mounted on the rear face of each stay-log, and devices working in said cylinders operated by fluid-pressure and connected with the chucks for the purpose specified.

2. In a veneer-cutting machine, the combination with a slicing-knife, of a rotary block-carrier, a series of integral stay-logs each of substantially the length of the block to be cut and arranged radially on the carrier, set-works for advancing the stay-logs, means for retracting the stay-logs, a series of chucks carried by each stay-log and projecting from its front face for rigidly securing a block thereto, two sets of cylinders mounted on opposite sides of the rear face of each stay-log, devices working in said cylinders operated by fluid-pressure and connected with the chucks, and means for admitting to and exhausting fluid from said two sets of cylinders independently.

3. In a veneer-cutting machine, the combination of a rotary block-carrier, a series of stay-logs arranged radially on the carrier each of substantially the length of the block to be cut, a series of independently-movable chucks carried by each stay-log for rigidly securing a block thereto, and mechanism carried by each stay-log and operated by fluid-pressure for simultaneously actuating the chucks while permitting them to move independently of each other to different extents thereby equalizing the holding power of the chucks on the blocks.

4. A stay-log of substantially the length of the block to be cut, having on opposite sides of its front face two sets of sliding chucks and having on its rear side two sets of cylinders supplied with fluid under pressure, pistons working in said cylinders and a separate sliding connection between each piston and a single chuck whereby the chucks may be operated simultaneously but independently and thus equalize the holding power of the chucks on the block.

5. A stay-log provided with chucks sliding transversely to the axis of the stay-log, a series of long cylinders secured to the stay-log and having pistons working in them connected with the chucks on one side of the stay-log, and short cylinders secured to the stay-log having pistons connected with the other set of chucks.

6. The combination of a block-carrier, a stay-log mounted thereon, brackets projecting from the block-carrier between which the stay-log moves, a series of chucks on opposite sides of the stay-log, steam-cylinders attached to the stay-log and having pistons connected with the chucks and means for admitting steam to and exhausting it from the cylinders.

7. In a veneer-cutting machine, the combination of a rotary carrier, a series of stay-logs mounted radially thereon, set-works for advancing the stay-logs, devices for arresting the forward movement of the stay-logs, an engine mounted on the carrier and revolving therewith about its axis, and means for connecting the engine with a plurality of stay-logs to cause them to return to their retracted position.

8. In a veneer-cutting machine, the combination of a rotary carrier, stay-logs mounted radially thereon, set-works for advancing the stay-logs, devices for automatically arresting the forward movement of the stay-logs, a rotary engine mounted on the carrier and revolving therewith about its axis, and means for connecting said engine with a plurality of stay-logs to cause them to retreat at the will of the operator.

9. In a veneer-cutting machine, the combination of a rotary carrier, stay-logs mounted thereon, screw-rods engaging the stay-logs, radial shafts with which the screw-rods are geared, tangential shafts gearing with said radial shafts, shafts parallel with the axis of the carrier which gear with the tangential shafts, pawl-and-ratchet mechanism for operating said parallel shafts, means for operating said pawl-and-ratchet mechanism for advancing the stay-logs, engines mounted on the carrier and gearing between said engines and said parallel shafts to return the stay-log.

10. In a veneer-cutting machine, the combination of a rotary carrier, stay-logs mounted radially thereon, arms projecting rearwardly from the stay-logs, sockets into which the arms project and which are secured to the carrier, screw-rods connected with said arms, pawl-and-ratchet mechanism and connections between said pawl-and-ratchet mechanism and said screw-rods for advancing the stay-logs.

11. In a veneer-cutting machine, the combination of a carrier, a stay-log mounted thereon, pawl-and-ratchet mechanism, connections between the pawl-and-ratchet mechanism and the stay-log whereby the latter is advanced, a sliding block normally holding the pawl out of engagement with the ratchet-wheel, and connections between the stay-log and the block whereby the latter is shifted when the stay-log is advanced to its limit to cause the disengagement of the pawl with its ratchet-wheel.

12. The combination of a rotary carrier, a stay-log thereon, pawl-and-ratchet mechanism, connections between the pawl-and-ratchet mechanism and stay-log for causing the latter to advance, a block normally permitting the engagement of the pawl with its ratchet-wheel, a lever to which said block is connected and rods having sliding yielding connections which connect the stay-log with the lever whereby the sliding block is shifted to cause the pawl to disengage from its ratchet-wheel to arrest the forward movement of the stay-log.

13. The combination with a stay-log carrying chucks for attaching a bolt or block of wood thereto, of cylinders secured directly to the rear face of the stay-log and opposite the area in which the bolt lies, pistons operating in the cylinders and connected with the chucks, and means for supplying steam to the cylinders.

In testimony whereof I have hereunto subscribed my name.

CISCO R. TRAXLER.

Witnesses:
FRANK T. BALDWIN,
J. IRVING FULTON.